No. 774,581. PATENTED NOV. 8, 1904.
J. A. GOSSARD, Jr.
RAIL JOINT FASTENER.
APPLICATION FILED FEB. 29, 1904.
NO MODEL.
2 SHEETS—SHEET 1.
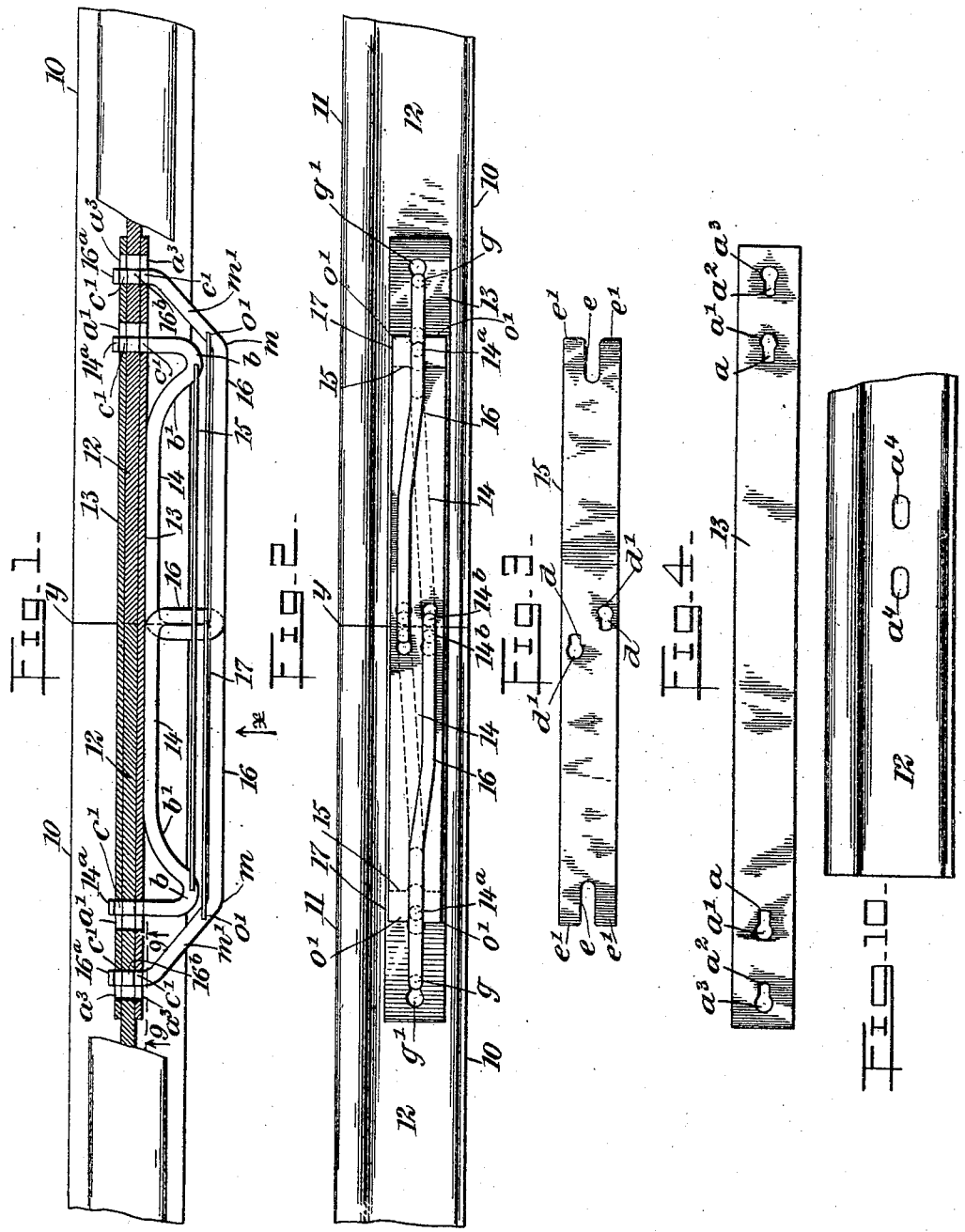
WITNESSES:
C. A. Jarvis.
Wm. L. Patton
INVENTOR
John A. Gossard Jr
BY
ATTORNEYS

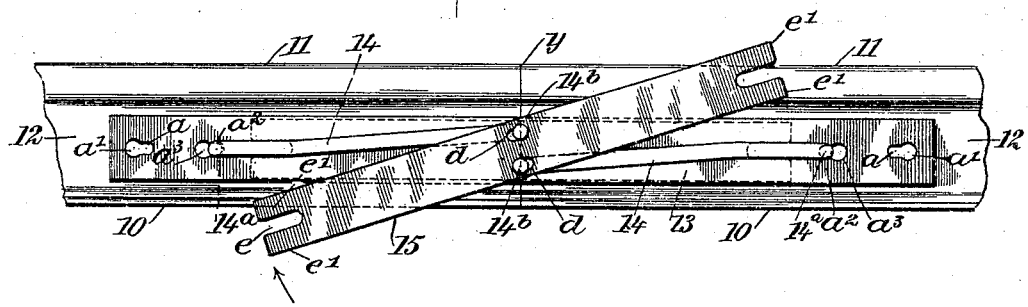

No. 774,581.

Patented November 8, 1904.

UNITED STATES PATENT OFFICE.

JOHN A. GOSSARD, JR., OF SOUTH SOLON, OHIO.

RAIL-JOINT FASTENER.

SPECIFICATION forming part of Letters Patent No. 774,581, dated November 8, 1904.

Application filed February 29, 1904. Serial No. 195,816. (No model.)

*To all whom it may concern:*

Be it known that I, JOHN AMOS GOSSARD, Jr., a citizen of the United States, and a resident of South Solon, in the county of Madison and State of Ohio, have invented a new and Improved Rail-Joint Fastener, of which the following is a full, clear, and exact description.

This invention relates to detachable means for securing railroad track-rails together at their meeting ends, and has for its object to provide novel details of construction for a rail-joint fastener which are adapted to be placed in position for securing together two meeting ends of track-rails under spring tension of parts of the fastener by the use of suitable tools or be removed by the same means, as occasion may require, a further object being to provide a rail-joint fastener that is held in place for connection of the rail ends and their lateral support at the joint by the spring tension of its parts only and is devoid of bolts and nuts usually employed.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a partly sectional plan view of two track-rails at their meeting ends and of details of the invention applied thereto for securing the rails joined together in sequence. Fig. 2 is a side view of the invention applied, seen substantially in direction of the arrow *x* in Fig. 1. Fig. 3 is a side view of a flat spring-plate employed. Fig. 4 is a like view of a flat clamping-plate having greater length than the plate shown in Fig. 3 and which in pairs embraces the webs of rail ends to be coupled therewith. Fig. 5 is a side view of the ends of two meeting track-rails and of details of the improved rail-fastener mounted thereon, said parts being disposed for initiating the locking adjustment of the same by a rocking movement of a spring latching-plate that is a detail of the invention. Fig. 6 is a side view of the locking device or rail-fastener, showing other details applied and in position to receive locking adjustment to be effected by rocking the spring latching-plate. Fig. 7 is a plan view of one of a pair of locking-bars employed. Fig. 8 is a plan view of a locking-bar of changed form and which in duplicate forms details of the invention. Fig. 9 is a transverse sectional view of an end portion of the locking-bar shown in Fig. 8 and a side view of a perforated end portion of a clamping-plate engaged with said locking-bar, the section being substantially on the line 9 9 in Fig. 1; and Fig. 10 is a side view of two track-rails at their meeting ends, showing oblong perforations in the web of one of said rails, which are essential details for connection of the improved rail-fastener with the track-rails near their joint.

In the drawings, 10 represents the ordinary base-flanges of two track-rails having smaller weight and gage, 11 the like balls or head portions of the rails, and 12 the rail-webs, which extend as flat integral portions between the balls and bases of the track-rails. Two duplicate clamping-plates 13 are provided, that are fitted flatwise between the bases and balls of the track-rails and seat oppositely upon the rail-webs 12, whereon they are held at an equal distance from the joint *y* between the ends of the meeting rails by means hereinafter fully described.

The clamping-plates 13 are each perforated at two points which are equally distant from the ends of the clamping-plates, and as shown in Fig. 4 for one clamping-plate these similar perforations each consist of a short longitudinal slot *a*, that at the end nearest the adjacent end of the plate merges into a circularly-enlarged opening *a'*. At a short distance from the slots *a*, that are formed with the circular enlargements *a'*, a similar slot *a*² is formed in each end portion of each clamping-plate 13, and these second sets of slots *a*² are enlarged circularly near their ends which are farthest from the slots *a*, as at *a*³, so that it will be seen that in each clamping-plate 13, near each end thereof, two slotted openings having circular enlargements at their outermost ends are formed.

As is clearly represented in Figs. 1 and 10, in the rail-webs 12, at points which are opposite the circular enlargements $a'$ and $a^3$ in the clamping-plates 13, elongated circular-ended holes $a^4$ are formed in said rail-webs, so as to produce alined elongated openings through the web and clamping-plates.

Two similar locking devices 14, of metal, which are preferably rounded in cross-section, are coacting details of the invention, said locking devices, which are represented in Figs. 1, 5, and 7, each being in the form of a metallic bar that for a main portion of its length is straight, this straight portion of each locking-bar 14 being so proportioned that it extends a suitable distance over each rail-web when in position for service. At one end of each locking-bar 14 an arm $14^a$ is bent laterally, so as to project the arm substantially at a right angle to the longitudinal axis of the bar, and, as shown in Fig. 7, a curved bend $b$ and a curved sloping formation $b'$ intervene the arm $14^a$ and the straight portion of each locking-bar. In the upper and lower surfaces of the respective arms $14^a$ two spaced rectangular channels $c$ are formed transversely and oppositely in pairs, which leaves a parallel-sided member $c'$ between each pair of channels of such thickness as will permit the free introduction of a respective member $c'$ into a complementary slot $a$ after the rounded end of the arm $14^a$ has been inserted through the circular opening $a'$ at the end of said slot. As shown in Fig. 1, the arm $14^a$ on each locking-bar 14 may be passed through the opposite circular openings $a'$ in each clamping-plate 13, and at the same time the ends of the arms are inserted through the oblong circularly-ended openings $a^4$ in the rail-webs, and it will be seen that by drawing the bars toward each other the flattened members $c'$ on the arms $14^a$ may be inserted into the slots $a$ and bind the clamping-plates 13 upon the rail-webs 12. The relative length of the locking-bars $14^a$ is such that they will lap somewhat past each other at their near ends when the arms $14^a$ are engaged with the rail-webs and clamping-plates 13, as stated, and upon these adjacent ends of the locking-bars arms $14^b$ are formed. The arm $14^b$ for each locking-bar 14 is located in the same horizontal plane with the arm $14^a$—that is, on the other end of said bar—and projects at a right angle in an opposite direction, as is clearly shown in Fig. 7. Each arm $14^b$ is rounded in the body and transversely channeled on opposite sides near its free end, these flat-bottomed channels producing parallel-sided members, such as $c'$. (Shown in Fig. 9.)

A spring latching-plate 15 coacts with the locking-bars 14 and, as is shown in Figs. 1, 3, and 5, consists of a flat rectangular elongated strip of resilient plate metal having a suitable length and width. At points equally distant from and near the longitudinal center of the latching-plate 15 two similar slot-openings $d$ are formed in said plate, said openings, that are suitably positioned near opposite edges of the plate, each having a circular enlargement $d'$ at the end of the slot which is nearest to a respective end of the latching-plate. The openings $d'$ are of such diameter that the cylindrical bodies of the arms $14^b$ may be inserted therethrough, so that the free ends of said arms will project outward, and obviously after their insertion the parallel-sided members $c'$ on the arms $14^b$ may be located in the slots $d$ by a sliding movement of the locking-bars toward said slots. At each end of the latching-plate 15 a slot $e$ is formed—that is, at the transverse center of the plate—and extends longitudinally of sufficient length to provide two spaced resilient fingers $e'$ thereon.

In assembling the parts of the rail-joint fastener that have been described the clamping-plates 13 are placed opposite each other over the webs of the track-rails at their meeting ends, so that the arms $14^a$ may be passed through the alined circular openings $a'$ in the clamping-plates and also through the oblong openings $a^4$ in the webs of the track-rails. Two trackmen, each having a crowbar, now press upon the outer sides of the arms $14^a$, so as to move the parallel-sided members, such as $c$, into the slots $a$ in the clamping-plates 13. The locking-bars 14 may be bent, as shown in Fig. 5, so as to spread their arms $14^b$ apart a suitable degree when the other arms are interlocked within the slots $a$ in the clamping-plates. The latching-plate 15 is now engaged with the arms $14^b$ by passing them outward through the circular ends of the slots $d$, the latching-plate being inclined edgewise from a horizontal plane to permit such an engagement to be effected, thus disposing the latching-plate as shown in Fig. 5. The position of the latching-plate now is such that the ends of said plate are disposed opposite the slopes $b'$ on the locking-bars 14 and near the outer surfaces of said bars. The latching-plate 15 is now rocked edgewise in direction of the arrow in Fig. 5, so as to force the fingers $e'$ to embrace the bent portion $b$, that is at the heel of each arm $14^a$, and this will also pull the flattened members, such as $c'$ on the arms $14^b$, into the slots $d$.

For railroads using a light-bodied track-rail the rail-fastening device that has been described will be very effective and reliable, serving to retain the track-rails alined with each other at their joints and permitting a slight resilience in the coupling connection that is advantageous.

To render the device perfectly reliable for service in connection of track-rails of heavy character and capable of securing the rails at their joints on curves or straight track, additional features are added to the details already described.

In Fig. 8 one of a pair of locking-bars 16 is shown, that are additional details of the invention in its completed form. Each locking-bar 16 consists of a straight body portion having a short lateral arm 16ª formed on one end and an arm 16ᵇ extended at the same side of the body portion from the opposite end of the same. The arm 16ª on each locking-bar 16 is transversely and rectangularly grooved, as at $h$, on opposite sides of its rounded body, thus producing a parallel-sided member, such as $c'$ in Fig. 9, thereon. The arm 16ᵇ, that projects parallel with the arm 16ª, is of a greater length than the latter, and in the same horizontal planes occupied by the opposite channels or grooves $h$ in the arm 16ª two spaced rectangular channels or grooves $i$ are formed in the arm 16ᵇ on each locking-bar 16. The like grooves or channels $i$, formed in opposite sides of each arm 16ᵇ, are arranged oppositely in pairs, producing flattened formations $c'$ thereon.

As before mentioned and shown in Figs. 1 and 10, an oblong opening $a^4$ is formed in each rail-web at points which will adapt said openings to register, respectively, with the slots $a^2$ and circular enlargements $a^3$ of said slots at corresponding ends of the clamping-plates 13. At $m$ on each locking-bar 16 and near the arms 16ᵇ an obtuse angular bend is formed, the bodies of the locking-bars remaining in the same planes with the arms at each end thereof. The arms 16ᵇ are in service inserted through the alined circular openings in the clamping-plates 13 and also through the oblong openings in the rail-webs that register therewith. Forcible pressure may now be applied upon the arms 16ᵇ with crowbars or the like, so as to press them endwise toward each other, and thus cause the short arms 16ª to lap slightly past and one above the other.

A latching-plate 17 is a completing detail of the invention and, as shown in Figs. 1 and 6, consists of a normally flat thin plate of resilient metal that may be similar to the latching-plate 15 in shape, with the exception that it is somewhat longer than said latching-plate. At an equal distance each side of the longitudinal center of the body of the plate 17 two slot-openings are respectively formed, these slots being similar to the slots $d$ in the latching-plate 15 and merge at their ends that are farthest from each other into circular enlargements like the enlargements $d'$ in said latching-plate. At the transverse center in each end of the latching-plate 17 a longitudinal slot $o$ is formed of suitable length and width, the corners at the ends of said slots being preferably rounded, as indicated in Fig. 6, and said slots produce two resilient fingers $o'$ at each end of the plate 17. In the application of the latching-plate 17 the short arms 16ª are respectively inserted through the circular end portions of the slot-openings near the center of the plate 17, and the openings are so spaced apart, considered transversely of the plate, that said latching-plate will be diagonally disposed with regard to the locking-bars 16, as shown in Fig. 6.

It will be seen in Fig. 1 that the angular bends $m$ in the bodies of the locking-bars 16 adapt the straight portions of said bars to occupy the same vertical plane one above the other and near to the outer surface of the latching-plate 15 and, furthermore, that these bends also afford inclined sides $m'$ between the bends $m$ and the arms 16ª.

The length of the latching-plate 17 is so proportioned that the fingers $o'$ thereon will be adapted to ride over and interlock with the inner surfaces of the inclines $m'$ near the bends $m$ when the latching-plate is rocked so as to cause its ends to contact with the locking-bars 16. Upon the application of a crowbar or other lever to the latching-plate 17 for rocking it into a horizontal position the flattened places, such as $c'$ on the arms 16ª, will be partially or completely drawn into the slots $n$, and the fingers $o'$ will be sprung into clasping engagement with the inclines $m'$ on the locking-bars 16, this engagement being indicated in Fig. 1.

It will be seen that the relative construction and particular connection of the locking-bars with the clamping-plates and resilient latching-plates, as hereinbefore described, serves to bind these parts in interlocked engagement with each other when they are adjusted by levers to draw upon the locking-bars and subsequently rock the latching-plates into locking engagement with the latter, the torsional strain put upon the latching-plates serving to lock them in position for holding other details of the rail-joint fastener interlocked and reliably secured as a concrete device.

If occasion requires, the rail-fastening device may be readily removed from the rail-joint by means of crowbars or similar levers applied to spring the latching-plates 15 17, so as to release them from the locking-bars 14 16 and also draw or press the locking-bars endwise to permit their arms to be detached from the clamping-plates 13 in an obvious manner.

It is claimed that the improved rail-joint fastener is simple, durable, reliable in service, and may be applied or removed quickly, as occasion may require.

Having thus described my invention, I claim as new and desire to secure by Letters Patent—

1. A rail-joint fastener, comprising clamping-plates imposed on opposite sides of the rail-webs at a rail-joint, said webs and plates having opposite transverse openings therein, locking-bars, each having a lateral arm at one end, said arms having interlocked engagement within the opening in the clamping-plates and rail-webs, and means for releasably holding the locking-bars in interlocked engagement with said clamping-plates and rail-webs.

2. A rail-joint fastener, comprising flat clamping-plates imposed on opposite sides of the rail-webs at a rail-joint, said webs and plates having opposite transverse openings therein, said openings in the plates near their ends each consisting of a longitudinal slot merging at one end into a circular opening, locking-bars each having a laterally-extended arm at one end, said arms each having flattened formations thereon adapted for interlocked engagement within the slot-openings, and means for releasably holding the arms of the locking-bars in interlocked engagement with the clamping-plates and the rail-webs.

3. A rail-joint fastener, comprising two clamping-plates imposed on opposite sides of the rail-webs at a rail-joint, said plates near their ends having opposite longitudinal slot-openings therein that merge at their outer ends in circular enlargements, these paired slot-openings being opposite oblong openings formed in the rail-webs, two locking-bars each having a laterally-extended arm at one end, said arms each having two spaced flattened formations thereon respectively adapted to interengage with the slots in the clamping-plate ends, and means for holding the locking-bars adjusted so as to prevent release of their arms from the clamping-plates and rail-webs.

4. A rail-joint fastener, comprising two clamping-plates imposed on opposite sides of rail-webs at a rail-joint, said plates near their ends having longitudinal slot-openings terminating at their outer ends in circular enlargements, these enlargements and slot-openings being in pairs opposite an oblong opening in a respective rail-web, two locking-bars each having a laterally-bent arm on each end, said arms trending oppositely, two spaced flattened formations on one arm on each locking-bar, these flattened formations on a respective arm being adapted for interengagement within the longitudinal slots in the clamping-plates at respective ends thereof, and releasable means engaging the remaining arms of the locking-bars for holding the other arms interlocked within the slots in the clamping-plates.

5. A rail-joint fastener, comprising two clamping-plates imposed on opposite sides of rail-webs at a rail-joint, said plates near their ends having longitudinal slot-openings terminating at their outer ends in circular enlargements, these paired slot-openings being opposite oblong openings in the rail-webs, two locking-bars each having a laterally-bent arm on each end, the arm at one end of each locking-bar being longer than the one at the other end, each bar being formed with an incline that extends from the heel of the longer arm toward the shorter arm, each longer arm having two spaced flattened formations on opposite sides thereof, said flattened formations being adapted for interengagement within the slots in the clamping-plates, the shorter arms each having a flattened formation near its free end on opposite sides thereof, a latching-plate having spaced resilient fingers at each end, and two longitudinal slots therein near the longitudinal center of the plate, terminating at their outer ends in circular enlargements, the flattened formations on each short arm having interengagement within said slots when the latching-plate is disposed at an angle to the longitudinal plane of the locking-bars, and serving to hold said bars in locked engagement and under tensional strain when said latching-plate is rocked toward the inclines on the locking-bars so as to clasp the resilient fingers thereon.

6. A rail-joint fastener, comprising two clamping-plates imposed on opposite sides of two rail-webs at a rail-joint, said plates and rail-webs having spaced opposite slot-openings therein at two points near each end of the plates, two pairs of locking-bars, each pair having arms at each end, and flattened formations on each arm, certain of said flattened formations having interengagement within corresponding slot-openings in the clamping-plates, the arms at the other ends of each pair of locking-bars each having a flattened formation on opposite sides thereof, near the free end, two similar latching-plates, each having a pair of spaced resilient fingers at each end thereof and also having a pair of spaced longitudinal slots near the longitudinal center, each pair of slots in a latching-plate receiving the ends of respective arms and the flattened formations thereon, when the latching-plates are disposed diagonally to the longitudinal planes of respective pairs of locking-bars, and putting said bars, along with the plates, under tensional strain when the latching-plates are rocked toward respective pairs of locking-bars for locked engagement of the resilient fingers on the latching-plates with corresponding locking-bars.

In testimony whereof I have signed my name to this specification in the presence of two subscribing witnesses.

JOHN A. GOSSARD, Jr.

Witnesses:
   Geo. W. Gossard,
   John W. Huffman.